United States Patent Office 3,285,773
Patented Nov. 15, 1966

3,285,773
VITREOUS ENAMELS FOR HOT WATER TANKS
Lester M. Dunning, Parma, Ohio, assignor to Ferro Corporation, Cleveland, Ohio, a corporation of Ohio
No Drawing. Filed May 10, 1965, Ser. No. 454,634
6 Claims. (Cl. 117—129)

This application is a continuation-in-part of my co-pending application Serial No. 236,708, filed November 9, 1962, now abandoned.

This invention relates, generally, to an improved vitreous enamel for coating metals, and in particular to an improved vitreous coating having superior resistance to hot water attack.

Various porcelain enamel compositions have been used extensively in the past for coating the interior, water jacket or tank, of both electrically and gas heated hot water tanks. Through the use of a vitreous enamel coating, sheet steel and aluminum hot water tanks are provided with a protracted useful life expectancy, obviating the need for utilizing more expensive, corrosion resistant metals such as copper.

New and better ways of improving the resistance of vitreous enamel coatings to hot water attack are being continually sought, and this invention provides such an improvement.

It is an object, therefore, of this invention to produce an improved vitreous enamel coating having superior resistance to the attack of hot water.

It is a further object of this invention to provide a method of vitreous coating metallic articles to reduce the susceptibility of said coated article to hot water attack.

It is yet another object of this invention to provide a metal article having an improved coating of vitreous enamel fused thereon.

Other objects of the invention will appear as the disclosure proceeds.

Briefly and simply stated, the objects of this invention are achieved by the addition of powdered quartz to a vitreous coating, either prior to or subsequent to milling same to a slip, but prior to applying same to a workpiece, powdered quartz being added in such an amount that, contrary to usual practice, a certain percentage of said quartz is retained in the matrix of the fused enamel coating in its crystalline, rather than amorphous form. That is, although the powdered quartz is substantially dispersed throughout the glassy phase of the fused vitreous enamel coating, only a fraction of the quartz is taken into solution, so to speak, in the fused coating, the remainder of said quartz, while dispersed throughout the glassy matrix of the fused vitreous coating, being present in its crystalline form, usually in the form of alpha quartz.

By way of illustrating a preferred embodiment of this invention, porcelain enamel frits, utilizing well known raw batch materials, and conventional smelting methods, were smelted and fritted to compositions having the melted compositions listed below in Table I.

Separate wet mills of frits A, D and E were set up using the following standard mill-addition, varying the quartz as shown in Table II.

| | Parts by weight |
|---|---|
| Frit | 100 |
| Clay | 7 |
| Hydrous borax | ½ |
| Bentonite | ¼ |
| Water | 60 |
| NaNo₂ [1] | |

[1] ¼ part NaNO₂ was added after milling.

The foregoing mill-additions were milled to an enamel slip having a particle fineness of 6 to 8 gms./50 ml. sample retained when washed through a 200 mesh screen.

The foregoing slips were then applied by spraying to hot rolled steel sample plates which had been prepared for enameling using conventional methods, the normal application weight, for purposes of this comparison, being held to about 8 mils thickness.

After the steel samples were thoroughly dried, following spraying thereon of the slip, they were fired in a conventional enameling furnace set at a temperature of approximately 1600° F. for 8 minutes to fuse the enamel coating, but as is well known, the firing time and temperature may be varied considerably depending upon such factors as the bulk of the article to be fired, metal guage, relative fusibility of the coating, etc.

It appears that during firing of the enamel coating the frit, as usual, goes through an incipient fusion stage fairly early in the firing cycle, during which the melting frit begins to take the mill-added quartz into solution in the glass at a rapid rate, with a portion of any excess mill-added quartz dispersed in the coating as a crystalline phase of alpha quartz. By "excess" is meant any quantity of mill-added quartz which remains out of solution after fusion and cooling of the enamel coating.

While it is well known to those skilled in the art, it will be emphasized here for purposes of clarity that an enamel coating is essentially a glass, and a glass in turn is generally considered to be an amorphous, solid solution of its constituents, with little or no crystal phase present. For example, X-ray diffraction analysis of the frits represented by the composition of Table I would reveal no crystalline phase present, all frit components being dissolved, so to speak, into an amorphous glass. Generally, the mill-addition components, upon fusing of the vitreous coating, are also taken into solution, becoming part of the amorphous, vitreous coating or glass. Thus, small amounts of quartz when used as a mill-added component, are normally completely taken into solution in the glassy matrix, and small percentages of quartz, up to 10%, have been used from time to time as a mill-added component for ground coats. See the last paragraph, page 261 of "Porcelain Enamel," Second Edition, by Andrews. But percentages of quartz in the mill-addition, in excess of 15%, have previously been avoided

TABLE I
[Percent]

| | A | B | C | D | E | F | G | H | I | J | K |
|---|---|---|---|---|---|---|---|---|---|---|---|
| B₂O₃ | 9.0 | 9.0 | 14.3 | 14.5 | 9.3 | 11.2 | 9.2 | 9.1 | 7.1 | 8.9 | 9.1 |
| Na₂O | 22.1 | 22.1 | 19.6 | 18.0 | 20.9 | 20.8 | 20.7 | 20.6 | 20.5 | 20.1 | 20.5 |
| SiO₂ | 46.5 | 43.4 | 46.5 | 50.8 | 40.7 | 38.5 | 43.2 | 43.2 | 44.9 | 44.0 | 40.7 |
| CaO | 1.4 | 1.4 | 1.4 | 2.5 | 1.2 | 1.2 | 1.2 | 1.2 | 1.2 | 1.2 | 1.2 |
| F₂ | 8.7 | 8.7 | 6.7 | 3.5 | 6.7 | 6.7 | 6.7 | 6.6 | 6.6 | 6.4 | 6.6 |
| Li₂O | 0.8 | 3.2 | 0.8 | 2.4 | 3.2 | 3.6 | 2.7 | 3.1 | 3.6 | 3.6 | 3.6 |
| ZrO₂ | 6.2 | 6.2 | 6.2 | 4.6 | 14.0 | 13.9 | 12.3 | 12.3 | 12.2 | 11.9 | 14.4 |
| TiO₂ | 2.0 | 2.0 | 2.0 | 1.9 | 1.8 | 1.8 | 1.8 | 1.7 | 1.7 | 1.7 | 1.7 |
| Co₃O₄ | 1.5 | 1.5 | 1.2 | 0.7 | 1.3 | 1.3 | 1.3 | 1.3 | 1.3 | 1.3 | 1.3 |
| MnO₂ | 0.4 | 0.4 | 0.5 | 0.5 | 0.4 | 0.5 | 0.4 | 0.4 | 0.4 | 0.4 | 0.4 |
| NiO | 1.2 | 0.5 | 0.8 | 0.6 | 0.5 | 0.5 | 0.5 | 0.5 | 0.5 | 0.5 | 0.5 |
| Total | 99.8 | 98.4 | 100.0 | 100.0 | 100.0 | 100.0 | 100.0 | 100.0 | 100.0 | 100.0 | 100.0 | inasmuch as it was felt that quartz, being an extremely refractory material, would tend to adversely affect the fusibility and surface characteristics of the final coating; particularly, it was felt that if undissolved mill-added quartz were present in the finished, fired enamel, its presence would be manifest through a coarse, low gloss surface texture. We have, however, found that up to 70 parts by weight of quartz in the mill-addition can not only be tolerated, but that it provides far superior protection against the attack of hot water as will be hereinafter described.

For purposes of evaluating the results of my novel invention, a test unit was employed consisting essentially of a 30 gallon hot water tank fabricated of stainless steel with a number of holes in its side. Curved steel sample plates of coatings to be tested were prepared as described above, the curvature of the test plate conforming to that of the test tank, the test pieces being gasketed over the test tank apertures so that an area of approximately 2 square inches was exposed for test purposes. The tank was then operated with softened water at a constant temperature of 215° F., 10 gallons of water being circulated through the tank approximately every three hours to avoid saturating the test solution with the products of corrosion.

At timed two week intervals, the test samples were scrubbed, dried and weighed, weight losses recorded and taken as a measure of the coatings resistance to hot water attack.

Listed below in Table II are the results of test runs made with frits A, D and E, showing the variation of the percent quartz in the slip, and the dramatic reduction in weight loss over a period of weeks in proportion to the amount of powdered quartz added to the slip. The introduction of quartz into the coating incidentally may be accomplished by using any high percentage silica bearing raw materials such as feldspar, nepheline syenite, etc. The crystalline form of the quartz as added to the mill-addition is not highly critical, as amorphous quartz added to the mill would convert to alpha if it were to retain its crystalline form at elevated temperatures.

alpha quartz by volume in the finished fired coating was determined and the results are illustrated in Table III.

*Table III*

| Frit | Percent Silica in Mill | Percent Quartz in Fired Coating |
|------|------------------------|--------------------------------|
| A | 0 | 0 |
| A | 10 | 1 |
| A | 40 | 15 |
| A | 50 | 30 |
| A | 60 | 33 |
| D | 0 | 0 |
| D | 10 | 1 |
| D | 40 | 23 |
| D | 50 | 30 |
| D | 60 | 37 |
| E | 0 | 0 |
| E | 20 | 3.5 |
| E | 30 | 3.5 |
| E | 40 | 7.5 |
| E | 50 | 20 |
| E | 60 | 30 |
| E | 70 | 35 |

From Tables II and III it will be seen that there is a direct relationship between the increase in water resistance and the percentage of alpha quartz in the fired coating. I have determined that no significant improvement occurs below 20% silica added to the mill, as indicated by weight loss, as well as the development of crystalline quartz; that is, at approximately 20% quartz in the slip the first trace of crystalline quartz becomes identifiable in the fired enamel, and a significant increase in water resistance occurs.

Although it is most convenient to add powdered quartz to the mill, prior to grinding the mill charge to a slip, the powdered quartz may also be added to the slip, after milling, and dispersed therethrough with adequate blunging.

As will now be apparent from the disclosure, my invention resides primarily in the development of a crystalline phase of quartz in an enamel coating through the addition of quartz to an enamel slip, prior to application to a workpiece and fusion thereon to a vitreous coating, in an

*Table II*

| Frit | Percent Quartz in Mill | 2 | 4 | 6 | 8 | 10 | 12 | 14 |
|------|-----------------------|------|------|-------|-------|-------|------|------|
| A | 10 | [1]16.1 | 33.0 | 53.1 | 71.5 | 121.1 | [2] | |
| A | 40 | 6.1 | 11.1 | 18.9 | 23.6 | 30.8 | 39.1 | |
| D | 10 | 19.8 | 43.1 | 57.0 | 85.3 | 149.8 | [2] | |
| D | 40 | 7.5 | 14.5 | 20.3 | 28.2 | 39.1 | 46.1 | |
| D | 50 | 6.2 | 12.3 | 17.1 | 24.5 | 32.4 | 38.8 | |
| D | 60 | 6.2 | 12.0 | 16.9 | 24.0 | 32.0 | 39.6 | |
| E | 0 | [1]22.5 | 68.9 | 104.9 | [2] | | | |
| E | 20 | 8.1 | 14.6 | 21.1 | 28.2 | 38.1 | 52.8 | 68.0 |
| E | 30 | 3.8 | 9.0 | 13.1 | 17.5 | 21.9 | 28.7 | 35.2 |
| E | 40 | 3.8 | 7.1 | 10.7 | 13.8 | 19.2 | 25.0 | 30.8 |
| E | 50 | 3.1 | 6.0 | 9.2 | 12.8 | 13.8 | 19.5 | 24.5 |
| E | 60 | 2.1 | 4.7 | 7.7 | 9.7 | 13.6 | 18.3 | 22.4 |
| E | 70 | 1.6 | 4.9 | 8.0 | 9.4 | 13.2 | 16.7 | 20.8 |
| E | 80 | 2.1 | 4.6 | 6.5 | 8.7 | 12.7 | 17.0 | 20.7 |

[1] Weight loss, mgms./sq. in.
[2] Failed, indicates penetration through the coating to the steel and a rusting condition develops. This rusting invalidates weight losses.

From the foregoing, it will be seen that the higher the quartz milladdition, the greater the resistance to hot water attack. And, although the absolute values vary with each frit, the trend toward increased water resistance with increased quartz is quite apparent.

To correlate the greatly improved results achieved, with the presence of crystalline quartz in the fired coating, enamels A, D and E were examined, after firing but before testing, for the presence of alpha quartz using conventional X-ray diffraction equipment. The percentage of amount greater than twenty percent, based on the weight of frit in the slip, and in an amount sufficient to provide an excess of quartz, in the fired enamel, in its crystalline form. Depending upon the frit composition, a given quantity of quartz, added to the slip, will provide varying amounts of crystalline undissolved quartz in the fired coating, as seen from Tables II and III. Thus, in practice, a series of coatings would be investigated for desirable properties, aside from those imparted by a quartz addition. Then, using the test procedure outlined herein, variable quartz additions may be evaluated to determine the amount which provides optimum results from the standpoint of water resistance, in combination with any given frit, or combination of frits.

I claim:
1. As an article of manufacture a metallic substrate having fused thereon an amorphous vitreous coating with a crystalline phase of alpha quartz dispersed therethrough, said coating being the product of an enamel slip applied to and fused on said metallic substrate, said slip having had contained a milled frit, said frit having had contained therein at least 4.6% by weight $ZrO_2$, said slip having had added thereto prior to application to said substrate from about 20% to about 70% quartz, based on the weight of said frit within said slip, a portion of said quartz having been taken into solution in the fused coating, the remainder of said quartz comprising the aforementioned crystalline phase dispersed throughout said enamel coating.

2. The article of manufacture of claim 1 wherein said quartz, when added to said slip, was in the form of alpha quartz.

3. The article of manufacture of claim 1 wherein said quartz, when added to said slip, was in the form of amorphous quartz.

4. The method of manufacturing a workpiece having a vitreous coating superimposed thereon said coating having improved resistance to hot water attack, said method comprising the steps of wet milling a fritted composition to a slip, said fritted composition having had contained therein at least 4.6% by weight $ZrO_2$ the mill addition for said slip comprising a compound containing the equivalent of at least 20% $SiO_2$ based upon the frit present in said slip, applying said slip to a substrate, fusing same thereon, simultaneously with the preceding fusing step, dissolving at least some of said quartz in said fused coating as amorphous quartz, leaving the remainder of said quartz within said glass matrix in the form of alpha quartz, and cooling said coating to its solid state to provide an improved vitreous coating.

5. The method of claim 4 wherein the compound containing the equivalent of at least 20% $SiO_2$ is added to the slip after milling but prior to application thereof to said substrate.

6. The method of claim 4 wherein the $SiO_2$ containing compound added to said slip contained the equivalent of from about 20% to about 70% of $SiO_2$ based upon the frit present in said slip.

References Cited by the Examiner

UNITED STATES PATENTS

| | | | |
|---|---|---|---|
| 2,757,105 | 7/1956 | Terry | 106—48 X |
| 3,037,828 | 6/1962 | Michael | 117—129 X |
| 3,051,589 | 8/1962 | Sanford et al. | 117—129 X |
| 3,184,320 | 5/1965 | Michael | 106—48 |

ALFRED L. LEAVITT, *Primary Examiner.*

JOSEPH B. SPENCER, MURRAY KATZ, R. S. KENDALL, *Assistant Examiners.*